United States Patent [19]
Monne et al.

[11] 3,744,618
[45] July 10, 1973

[54] CHAIN CONVEYORS

[76] Inventors: Maxime Monne, 19 bis Bld. Delessert F 75; Michel Eudier, 3 rue Andrieux F 75, both of Paris, France

[22] Filed: May 26, 1971

[21] Appl. No.: 147,144

[52] U.S. Cl. .............................. 198/177, 198/168
[51] Int. Cl. ........................................ B65g 19/00
[58] Field of Search ............... 198/204, 184, 168, 198/195, 177

[56] References Cited
UNITED STATES PATENTS
2,747,725  5/1956  Hatch et al. ..................... 198/204 X
2,066,206  12/1936  Laurie ............................ 198/184
3,250,379  5/1966  Leach ............................. 198/168
3,509,987  5/1970  Flaith et al. ..................... 198/195

*Primary Examiner*—Edward A. Sroka
*Assistant Examiner*—Hadd S. Lane
*Attorney*—Arnold Robinson

[57] ABSTRACT

A chain conveyor comprises links connected for universal flexure and guided and supported by structure faced with lubricated porous material of undulating form. The links are chamfered so that a wedge of lubricant is formed between the crests of the undulations and the links.

6 Claims, 4 Drawing Figures

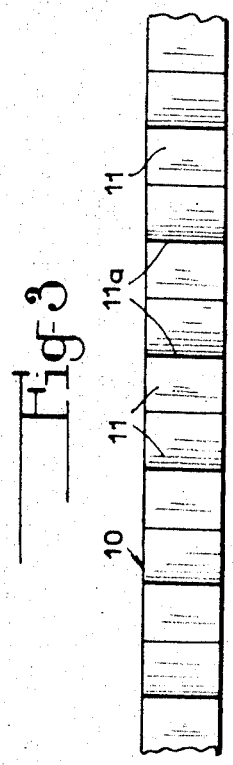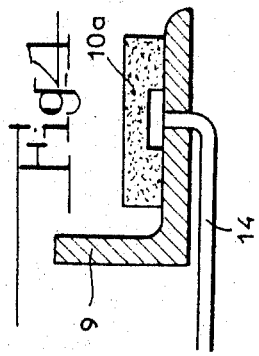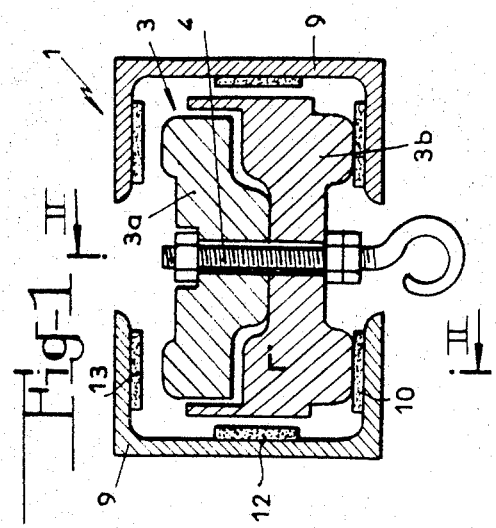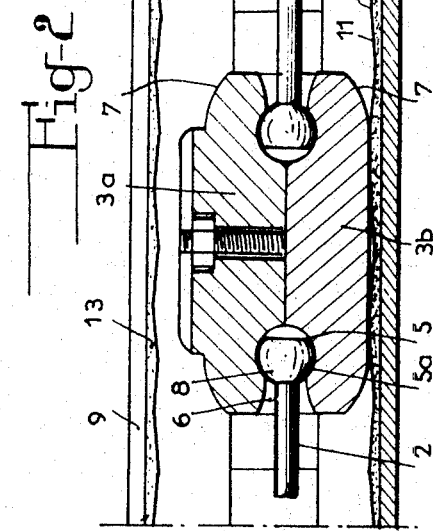

3,744,618

CHAIN CONVEYORS

BACKGROUND OF THE INVENTION

1. Field of the Invention

This invention relates to chain conveyors.

2. Description of the Prior Art

Conveyors produced up to the present time are generally constituted by a series of carriages or trolleys which are provided on their upper parts with rollers engaged on a support rail and guide rail and which are interconnected by lengths of chain arranged externally of this rail or which themselves constitute links of a chain arranged internally of the rail.

Such conveyors have the disadvantage of being noisy and besides are operable only at relatively low speeds. Moreover, particular arrangement must be provided in the external chain conveyor in order to guide the lengths of chain in or through bends, in such a manner that the carriages or trolleys are pulled only in their displacement direction and not laterally.

An object of the invention is the provision of an improved chain conveyor which overcomes these disadvantages and which obviates roller bearings, ball bearings, cardan joints and similar devices.

SUMMARY OF THE INVENTION

According to the present invention there is provided in a chain conveyor, a plurality of interconnected links, means for supporting loads from at least some of the links, and guide and support structure for the links, at least a support surface of the structure having a lubricated antifriction face on which the links can slide, said face being formed with undulations.

The anti-friction surfaces need to be provided only on the lower part of the rail supporting the links; but they may also be provided on the lateral parts of this rail, in order to provide guidance of the links and to facilitate their movement through bends, as well as on the upper part when the rail has upwardly or downwardly inclined portions.

In one embodiment in accordance with the invention, the anti-friction surfaces are of a porous material and means are provided for supplying air or oil under pressure.

BRIEF DESCRIPTION OF THE DRAWING

FIG. 1 is a cross-section of one embodiment of a conveyor in accordance with the invention;

FIG. 2 is a section on the line II—II of FIG. 1;

FIG. 3 is a plan view of a slide surface of the conveyor; and

FIG. 4 is a fragmentary section of a detail of a modification of the embodiment of FIG. 1.

DESCRIPTION OF THE PREFERRED EMBODIMENT

As is shown in the drawing, the conveyor comprises a guide rail 1 and a chain which can be displaced within the rail and from which loads are suspended. The chain comprises internal links 2 and external links 3.

Each of the external links 3 is formed from two portions 3a and 3b which are secured together by one or more pins 4. At each end of each link 3 there is a recess 5 of which the wall 5a is spherical and which expands outwardly into a diverging opening 6. The upper and lower edges of these links are chamfered as indicated at 7.

Each of the links 2 is terminated by a part-spherical head 8 engaged in the recess 5 of one of the internal links 3 and abuts against the wall 5a of the recess.

It will thus be seen that the links 3 are effectively connected by ball and socket joints, the diverging opening 6 of the link 3 allowing for the disengagement of the adjacent link 2.

The loads to be carried are suspended from the links 3, for example through the intermediary of the pins 4 and possibly by the links 2.

The rail 1 is formed by two channel-section members 9, of which the flanges are horizontal or substantially horizontal and which are interconnected at their upper parts, by connections, not shown.

Slide surfaces 10 of a self-lubricating material, produced, for example, by sintering are mounted on the lower flanges. The upper faces of these slide surfaces have a shallow V wave form 11, the inclination of the wave surfaces with respect to the mean or average direction of the slide surface being about 0.6 to 0.2 percent. The links 3 thus rest on the crests 11a of these waves or undulations.

Conventional means, not shown, provide for the continuous displacement of the chain, and may comprise a motor or other drive acting for example through gearing or an auxiliary chain provided with means in engagement with the conveyor chain.

In operation, as the chain is displaced within the rail 1, the links 3 slide on the crests 11a of the self-lubricated slide surfaces 10. The oil which impregnates these surfaces forms, owing to the presence of the inclined faces 11 and the chamfers 7, a hydrodynamic wedge which tends to maintain the links 3 to the crests 11a. The links 3 thus slide in fact on a film of oil so that the coefficient of friction is kept very low and the power output of the drive motor can be reduced relative to that of previous proposals.

The conveyor thus operates practically silently and the chain can move at an elevated speed of the order of 60 to 80 meters/per minute.

To enable the chain to turn at bends, the vertical walls of the channel-section members 9 are likewise provided, at least at the bends with slide surfaces 12 of a self-lubricating material. The pressure exerted on these surfaces, at a bend, is lower than that to which the surfaces 10 are subjected since it is merely a function of the tractive effort exerted on the chain and not the weight of the objects conveyed. It is however advantageous in order to obtain the effect of the hydrodynamic wedge and thus to reduce the friction force, to form the surfaces 12 with the same shallow wave form as the slide surfaces 10 and to form chamfers on the links 3, at the vertical edges thereof.

When as in the general case the path of the conveyor is not entirely in the same vertical plane, the chain then has rising sections, and so the upper flanges of the members 9 are provided with slide surfaces 13 of a self-lubricating material, again preferably formed with a shallow V wave form.

In order to reduce further the friction force on the slide surfaces 10, as is indicated at 10a in FIG. 4, is a porous material and provision is made for blowing in compressed air or oil, for example through a pipe 14.

We claim:

1. A chain conveyor, which comprises:

a plurality of interconnecting links, said links comprising first links of substantial length having chamfered leading and trailing edges, and second links, said first and second links being connected to form said interconnecting links;

means for supporting loads from at least one of said links; and guide and support means for said links, comprising at least one support surface having a lubricated anti-friction face formed with undulations thereon spaced less than said length on which said links slide, said lubricated anti-friction face and said first links being operative, when said first links are in motion, to form a hydro-dynamic wedge of lubricant therebetween.

2. A chain conveyor according to claim 1 wherein said first links further comprise two part-spherical recesses, one at each longitudinal end portion thereof, and wherein said second links comprise two balls, one at each end thereof and engaged in corresponding recesses of adjacent links.

3. A chain conveyor according to claim 1, wherein said face is self-lubricating.

4. A chain conveyor according to claim 1, wherein said lubricated anti-friction face is mounted on vertical guide surfaces of said guide support means.

5. A chain conveyor according to claim 1, wherein said lubricated anti-friction face is mounted on a horizontal guide surface of said guide and support means lying above the chain.

6. A chain conveyor according to claim 1, wherein said anti-friction face is of porous material and wherein the conveyor further comprises means for supplying oil under pressure to said face.

* * * * *